United States Patent [19]

Hostettler

[11] Patent Number: 4,791,156

[45] Date of Patent: Dec. 13, 1988

[54] DENTAL PROSTHETIC FROM HARD, RIGID, NON-HYDROPHILIC POLYURETHANE ELASTOMER

[76] Inventor: Fritz Hostettler, R.F.D. Box 318E, Stillhouse Rd., Freehold, N.J. 07728

[21] Appl. No.: 407,591

[22] Filed: Aug. 12, 1982

Related U.S. Application Data

[63] Continuation of Ser. No. 248,278, Mar. 27, 1981, abandoned.

[51] Int. Cl.$^4$ .................. C08G 18/32; A61C 13/00
[52] U.S. Cl. .................. 528/76; 433/199.1; 524/115; 525/440; 528/66; 528/77; 528/80; 528/81; 528/83
[58] Field of Search .................. 528/76, 66, 77, 81, 528/80, 83

[56] References Cited

U.S. PATENT DOCUMENTS

| | | | |
|---|---|---|---|
| 3,251,910 | 5/1966 | Barnhart | 264/17 |
| 3,579,482 | 5/1971 | Brotherton et al. | 528/78 |
| 3,987,546 | 10/1976 | Trampe | 433/199 |
| 4,024,637 | 5/1977 | Colpitts | 433/199 |
| 4,080,412 | 3/1978 | Colpitts et al. | 264/17 |
| 4,225,696 | 9/1980 | Colpitts et al. | 528/76 |

*Primary Examiner*—Harold D. Anderson
*Attorney, Agent, or Firm*—Vincent P. Pirri

[57] ABSTRACT

There is provided hard, non-toxic, substantially non-hydrophilic dentures including dentures comprising teeth anchored in or bonded to the denture material and optionally a linear of relatively soft elastomer. The hard dentures possess several highly desirable properties such as high heat distortion temperature and excellent impact resistance and rigidity resulting in excellent alignment with oral tissue and retention of superior fit and resistance to distortion under high thermal conditions.

6 Claims, No Drawings

DENTAL PROSTHETIC FROM HARD, RIGID, NON-HYDROPHILIC POLYURETHANE ELASTOMER

This is a continuation of application Ser. No. 248,278 filed Mar. 27, 1981, now abandoned.

BACKGROUND OF THE INVENTION

1. Field of Inventions

The present inventions relate to novel hard, non-toxic, substantially non-hydrophilic artificial dentures including dentures comprising teeth anchored in or bonded to the denture material; to novel non-toxic, non-hydrophilic dentures containing teeth anchored in a gum member comprising a tooth holding portion and a mouth engaging portion, the tooth-holding portion of which comprises rigid material described hereinafter and the mouth engaging portion of which comprises soft elastomeric material described hereinafter; to novel processes for fabricating the aforesaid dentures; and to novel mixtures or systems, generally two package systems, particularly those utilized in the preparation of the said rigid material of the tooth-holding portion of the denture.

2. Prior Art

Conventional hard prosthetic dentures have in the past been manufactured by setting individual teeth in a hard base structure formed from suitable plastics such as various hard acrylic resins. Such dentures may be made by making an initial impression in a suitable soft material such as alginate. The initial impression is then used to form a custom tray. The tray, in turn, is then used to make a secondary impression from polysulfide rubber or other similar material. The final steps involve forming the denture in wax, investing, and lost wax techniques. The denture is then fitted to the wearer and suitably lined to conform to the wearer's edentulous ridge.

Conventional hard dentures have also been provided with a soft layer to provide tissue relief. Such soft layers may be composed of acrylics, silicones and other rubber-like materials. U.S. Pat. Nos. 4,024,636, 4,024,637 and 4,080,412 to Colpitts and Frisch state that such soft layers, on aging, tend to harden and give off undesirable odors. Additionally, the patentees, Colpitts and Frisch, point out that some decomposition of the soft layer material may also occur presumably due to an oxidation process as well as pH fluctuations within the mouth. These patentees therefore propose an inexpensive, trouble-free, and easy to keep clean denture which they state overcomes the difficulties heretofore encountered in the prior art by providing for dentures consisting essentially of a hard portion (tooth holding portion) of non-hydrophilic polyether polyurethane having a hardness of not less than Shore D 40 and a soft portion (mouth-engaging portion) of non-hydrophilic polyether polyurethane having a hardness of not greater than Shore A 65.

U.S. Pat. No. 4,225,696 issued Sept. 30, 1980 to Colpitts and Wendt discloses that the hard non-hydrophilic polyurethane member of the dentures of the above-mentioned U.S. Pat. Nos. 4,024,636, 4,080,412 and 4,024,637 are "susceptible to distortion under the conditions prevailing in the mouth. Such distortion, accompanied by a loss of dimensional stability of the dentures, interferes with the ability of the dentures to retain a good fit with the mouth and remain in place without slippage;" column 1, lines 51–56 of U.S. Pat. No. 4,225,696. Under the "Summary of the Inventions" in column 1 and 2 thereof, the patentees state:

"It has now been discovered that polyurethane elastomers for use in artificial dentures can be provided with enhanced resistance to thermal distortion under the conditions of use when prepared from a polyether polyol and an aromatic polyisocyanate which the isocyanate groups are bonded directly to the aromatic nucleus and not to an aliphatic group as in the polyisocyantes employed in the preparation of known polyurethane elastomer dentures. As a result of the excellent degree of resistance to thermal distortion, dentures made with the aromatic polyisocyanate-based hard polyurethane elastomers herein retain a close fit with the mouth and are virtually free of any tendency toward slippage to which dentures made with prior polyurethane resins are liable.

Thus, in accordance with the present invention, a prosthetic denture is provided which is fabricated with a hard, substantially non-hydrophilic polyurethane elastomer with a hardness of not less than about Shore D 60 and preferably not greater than about Shore D 100, the elastomer being prepared from the reaction of a polyether polyol and an aromatic polyisocyanate in which the isocyanate groups are bonded directly to the aromatic nucleus.

While the hard polyurethane elastomer can be used in the preparation of the entire denture, including the teeth if so desired, it is also within the scope of this invention to utilize the hard polyurethane elastomer as the tooth-engaging portion of the denture bonded to a soft, substantially non-hydrophilic elastomer employed as the mouth-engaging portion of the denture. The latter elastomer can be selected from among any of the soft resins heretofore known and/or used in dental prostheses including the soft non-hydrophilic polyurethane elastomers of U.S. Pat. Nos. 4,024,636 and 4,080,412 to Colpitts et al, supra, which have a hardness of not greater than about Shore A 65 and preferably not less than about Shore A 15. Advantageously, the soft resin is a polyurethane prepared with a polyether polyol and an aromatic polyisocyanate in which the isocyanate groups are bonded directly to the aromatic nucleus. Accordingly, the invention herein further comprises a denture in which hard polyurethane elastomer and soft polyurethane elastomer elements as aforedescribed are bonded to form a unitary whole."

SUMMARY OF THE INVENTIONS

The present inventions provide for novel hard, non-toxic, rigid, substantially non-hydrophilic polyurethane dentures which can represent the entire denture (the tooth-holding portion and the mouth-engaging portion), including the teeth if so desired, and in certain aspects thereof, such novel hard dentures can be lined or bonded with any of the non-toxic, substantially non-hydrophilic soft resins heretofore known and/or used in dental prostheses including the polyurethane elastomeric materials. Such hard dentures per se as well as the hard denture suitably lined with soft resin are characterized by freedom from odor, oral tissue tolerance, ease of cleaning, dimensional stability, chemical and oxidative stability (in which case the polyester polyurethane dentures exhibit even better oxidative stability and thermal stability than the polyether polyurethane dentures), resistance to pH changes of the mouth, non-cracking, and excellent impact resistance. The tooth-holding portion of the denture because of its high heat distortion and excellent rigidity gives excellent alignment with the oral tissue and retains this definition of superior fit and resistance to distortion under relatively high thermal conditions, e.g., exposure to hot coffee and tea, hot peroxide cleansing operations, etc.

In one aspect, the novel hard dentures are prepared by a novel process, via the one-shot or prepolymer route, which involves the reaction of branched chain polyether polyols, preferably those which are normally liquid at room temperature, e.g., 20°–25° C., with organic polyisocyanates which are characterized by at least 2 isocyanato groups (—NCO) and at least one cycloaliphatic or aromatic structure which may be single-, poly-, fused- and/or bridged structure, at least one NCO group being directly bonded to the cycloaliphatic structure or at least two NCO groups, individually, being bonded to separate divalent $C_1$–$C_4$ aliphatic hydrocarbon chains which in turn are bonded to the cyclaliphatic or aromatic structure, with the proviso that none of the NCO groups of the polyisocyanate is directly bonded to the aromatic structure, e.g., isophorone diisocyanate, xylylene diisocyanate, cyclohexane-1,4-diisocyanate, and 4,4'-dicyclohexylmethane diisocyanate.

The hydroxyl equivalent weight of the polyether polyols contemplated in this aspect are in the range of from about 50 to 95, preferably from about 75 to 95. Such highly controlled conditions result in consistently hard polyurethane dentures which are, in particular, characterized by high heat distortion and excellent rigidity in addition to other properties exemplified previously. For convenience these hard dentures will be hereinafter referred to as the hard Denture A.

In a second aspect, the novel hard dentures are prepared by a novel process, via the one-shot or prepolymer route, which involves the reaction of the aforementioned branched chain polyether polyols with organic polyisocyanates in which at least two isocyanato groups, preferably all such isocyanato groups, are individually and directly bonded to aromatic carbon atoms of single-, poly-, fused- and/or bridged-aromatic structure. The hydroxyl equivalent weight of the polyether polyols contemplated in this second aspect are in the range of from about 50 to 115, preferably from about 75 to 110. Under the conditions contemplated in the second aspect there are prepared novel dentures with heat distortion characteristics and rigidity exceeding those of polyether Denture A. For convenience, the novel dentures of the second aspect will be referred to as the hard Denture B.

Additionally, an artificial denture can be fabricated from a hard, substantially non-hydrophilic polyurethane elastomer having a hardness of not less than about Shore D60 and not greater than about shore D100, said hard elastomer consisting essentially of the reaction product of a polyether polyol and an aromatic polyisocyanate in which the isocyanate groups are bonded directly to the aromatic nucleus. The polyether polyols may be a polyether diol, triol or tetrol having an equivalent weight of 1100 to 800. For instance, the polyether polyol may be derived from pentaerythritol or glycerol oxyalkylated with ethylene oxide, propylene oxide or mixtures thereof. The aromatic polyisocyanate may be illustrated by 2,4-tolylene diisocyanate, 2,6-tolylene diisocyanate, 3,3'-tolidene-4,4-diisocyanate, diphenylmethane-4,4'-diisocyanate or mixtures thereof.

In a third aspect, novel hard dentures can be prepared possessing even better chemical and oxidative stability (such as may occur during cleansing operation of the denture with hot tap water or with peroxide tablets or other oxidizing media). Such hard dentures are prepared, suitably by one-shot or prepolymer route, reacting polyester polyols, preferably those which are normally liquid at room temperature, e.g., 20°–25° C., with organic polyisocyanates which are characterized by at least 2 NCO groups and at least one cycloaliphatic or aromatic structure which may be single-, fused-, poly- and/or bridged structure, at least one NCO group being directly bonded to the cycloaliphatic or aromatic structure or at least two NCO groups, individually, being bonded to separate $C_1$–$C_4$ divalent aliphatic hydrocarbon chains which in turn are bonded to the cycloaliphatic or aromatic structure, e.g., isophorone, 4,4'-dicyclohexylmethane diisocyanate, 1,5-naphthalene diisocyanate, 4,4'-diphenylmethane diisocyanate, cyclohexane-1,4-diisocyante, xylylene diisocyanate, 4-(-isocyanatoethyl)cyclohexane isocyanate, tolylene diisocyanate, and 1,5-tetrahydronaphthalene diisocyanate. The hydroxyl equivalent weight of the polyester polyols in this aspect is in the range of from about 50 to 180, preferably from about 75 to 120. The polyester polyols include, in this aspect, those derived from polycarboxylic acids, e.g., dicarboxylic and tricarboxylic acids, and polyols, e.g., glycols, triols, tetrols, etc., as well as lactone polyols, especially epsiloncaprolactone polyols and mixed lactone polyols especially those in which the linear epsilon-caprolactone unit

predominates. For convenience, the novel dentures of the third aspect characterized by high heat distortion temperatures and rigidity will be referred to as the hard Denture C.

In a fourth aspect, novel hard dentures are prepared by a novel process, via the one-shot or prepolymer route, which involves the reaction of branched chain polyols such as branched chain polyfunctional polyols, polyether polyols and polyester polyols described herein, with organic polyisocyanates which are characterized by at least 2 isocyanato groups and at least one heterocyclic ring structure, at least one NCO group, individually, being directly bonded to the heterocyclic ring structure or at least one NCO group, and preferably 2 or 3 NCO groups, being bonded to a $C_1$–$C_4$ aliphatic chain or ring structure (cycloaliphatic, aromatic or heterocyclic) which in turn is bonded to the heterocyclic structure. The hydroxyl equivalent weight of the polyols contemplated in this aspect are in the range of from about 50 to 180, preferably from about 75 to 120. For convenience, the hard novel dentures of the fourth aspect characterized by very high heat distortion temperatures and rigidity will be referred to as the hard Denture D.

DETAILED DESCRIPTION OF THE INVENTIONS

The process and dental equipment for preparing hard dentures per se or hard dentures lined or bonded with a soft or resilient material are well documented in the literature; see, by way of illustrations, U.S. Pat. Nos. 3,251,910, 3,987,546, 4,024,636, 4,024,637, and 4,080,412.

The novel hard polyurethane denture per se or the novel hard portion of the denture lined or bonded with a soft elastomer material possesses a heat distortion temperature of at least about 65° C., preferably at least about 70° C., as measured according to ASTM D 648. Such dentures are characterized, as indicated previously, by a myriad of highly desirable properties, most significantly by high Shore D hardness values (ASTM D2240), excellent rigidity, thus offering to the user of the denture a high degree of comfort in view of the ability of the denture to retain a close fit with the mouth by virtue of its excellent resistance to thermal distortion. The soft elastomer will be characterized by a lower hardness in the Shore A range, as hereinafter discussed. The soft elastomer of the denture should not be so soft that it fails to function as intended, or fails to retain the close comfortable fit within the mouth.

The polyether polyols especially desirable in preparing Dentures A, B and D include the lower 1,2-alkylene oxide, e.g., ethylene oxide, propylene oxide, mixtures thereof, etc., adducts of branched chained tri-, tetra-, penta-, hexa-, etc., functional compounds, e.g., glycerol, 1,1,1-trimethylolpropane, 1,2,6-hexanetriol, 1,2,4-butanetriol, pentaethriol, erythritol, alpha-methyl glycoside, xylitol, sorbitol, and dipentaerythritol in which the 1,2-alkylene oxide adduct contains on the average up to one oxyalkylene unit (from the 1,2-alkylene oxide) per hydroxyl group of the polyfunctional compound. The adducts can contain amounts of oxyalkylene units as low as about 0.3 oxyalkylene unit per hydroxyl group, with a preferred lower limit being about 0.5 oxyalkylene unit per hydroxyl group. Novel hard dentures exhibiting the aforesaid advantages are attainable using adducts which contain up to about 0.9 oxyalkylene unit per hydroxyl group of the polyfunctional compound. The oxyalkylene unit can be represented by the unit (OR) wherein R preferably is ethylene or propylene. The polyether polyol adducts which are suitable in the practice of the invention(s) contain at least 3 hydroxyl groups. Preferred adducts are those which contain from 3 to 6 hydroxyl groups and which are normally-liquid at room temperature. Adducts melting at moderately elevated temperatures, e.g., upwards to about 50° C., though contemplated, are not preferred and from a commercial standpoint offer drawbacks in view of the obvious disadvantages of melting the material in order to obtain manageable viscosities, homogeneity of reaction mixture, and uniformity of shot or charge into the denture mold. Optionally, the branched chained polyether polyol adducts can be mixed with small amounts of short chain diols and higher branched chained polyols, e.g., ethylene glycol, propylene glycol, butanediol, glycerol, 1,1,1-trimethylolpropane, 1,2,6-hexanetriol, 1,2,4-butanetriol, and the like. It is highly desirable that the polyether polyol adduct mixtures be normally-liquid at about room temperature. One or a mixture of polyfunctional compounds can be reacted with one or a mixture of 1,2-alkylene oxides, under conditions well-documented in the literature, to prepare the polyether polyol adducts useful in the practice of the invention. When utilizing mixtures of 1,2-alkylene oxides, preferably ethylene oxide and/or propylene oxide will predominate.

Two subclasses of polyester polyols especially desirable in the preparation of the novel hard Denture C are (i) the esterification polyol products which result from conventional esterification reactions involving polycarboxylic acids and polyols wherein the ratio of hydroxyl groups to carboxyl groups exceeds one, and (ii) the lactone polyols. Both subclasses are well documented in the literature. The polyols desirably contain from 2 to 4 hydroxyl groups, preferably from 2 to 3 hydroxyl groups, and include, for example, diols, triols and tetrols as exemplified by glycols (HO—$R_x$—OH wherein R is alkylene and x is 2 to 10), diethylene glycol, glycerol, 1,2,4-butanetriol, 1,2,6-hexanetriol, triethanolamine, 1,1,1-trimethylolpropane, diethanolamine, erythritol, pentaerythritol, and alpha-methyl glycoside. The polycarboxylic acids can be exemplified by the aliphatic polycarboxylic acids such as the di-, tri- and tetracarboxylic acids including the $C_4$-$C_{10}$alkanedioic acids or their anhydrides, e.g., succinic, glutaric adipic, and azelaic acids and their anhydrides; 1,2,4-butanetricarboxylic acid; itaconic acid; the aromatic polycarboxylic acids, e.g., the phthalic acids, pyromellitic anhydride, the naphthalenedioic acids, and the like. The esterification polyol products can be prepared by reacting one or more polyfunctional polyols with one or more polycarboxylic acids using relative amounts of the foregoing compounds to result in hydroxyl-terminated polyesters having hydroxyl equivalent weights of from about 50 to 180, preferably from about 75 to 120, using esterification techniques well-documented in the art.

Highly desirable lactone polyols are those which contain at least 3 hydroxyl groups, preferably 3 to 6 hydroxyl groups. These lactone polyols are further characterized by at least about 0.5 to about 1.2, preferably from about 0.6 to about 1.0, oxyalkylenecarbonyl

units per hydroxyl group, wherein each R individually is hydrogen or $C_1$-$C_4$-alkyl, preferably hydrogen or methyl, and most preferably hydrogen, and wherein x is an integer of from 5 to 7, preferably 5.

In the practice of various embodiments highly preferred lactone polyols are the oxycaproyl adducts of branched chained polyfunctional initiators having at least 3 active hydrogen atoms, preferably 3 to 6 such atoms, such as amino hydrogen (primary and secondary) and hydroxyl and mixtures thereof. Such adducts can be prepared by reacting together sufficient quantities of 6-hydroxycaproic acid or epsiloncaprolactone and one or more polyfunctional initiator including admixed therewith minor amounts of short chain diols, e.g., ethylene glycol, 1,4-butanediol, propylene glycol, neopentylene glycol, etc. The products resulting from the reaction of epsiloncaprolactone with polyfunctional initiators have been termed hydroxyl-containing initiated lactone polyesters (see U.S. Pat. No. 3,579,482) whereas the reaction of 6-hydroxycaproic acid with polyfunctional initiators can be termed oxycaproyl adducts. In this specification the expressions "lactone polyols" and "lactone (polyol) adducts" are employed in lieu of the aforementioned terms. Suitable polyfunctional initiators include the polyamines, the alkanolamines and other polyhydric compounds, such as the triols, e.g., 1,1,1-trimethylolpropane, 1,2,4-butanetriol, 1,2,6-hexanetriol, and glycerol; the tetrols, e.g., erythritol, pentaerythritol, and alpha-methyl glycoside; the pentols; the hexols, e.g., dipentaerythritol and sorbitol. Mixtures of lactone polyols and minor amounts of normally-liquid diols and/or triols can be used as the polyol reactants in preparing the hard denture.

Illustrative of the polyisocyanates which are contemplated in the preparation of hard Dentures A, B, C and D in accordance with the four aspects discussed previously include those described by W. Siefkin in Justus Liebigs Annalen der Chemie, 562, pages 75 to 136 including cyclobutane-1,3-diisocyanate; cyclohexane-1,3- and -1,4-diisocyanate and mixtures of these isomers; 1-isocyanato-3,3,5-trimethyl-5-isocyanatomethylcyclohexane such as described in German Auslegeschrift No. 1,202,785 and U.S. Pat. No. 3,401,190; hexahydrotolylene-2,4-diisocyanate and -2,6-diisocyanate and mixtures of these isomers; hexahydrophenylene-1,3-diisocyanate and/or 1,4-diisocyanate; phenylene-1,3-diisocyanate and -1,4-diisocyanate; tolylene-2,4-diisocyanate and -2,6-diisocyanate and mixtures of these isomers; diphenylmethane-2,4'-diisocyanate and/or 4,4'-diisocyanate; naphthylene-1,5-diisocyante; polyisocyanates having carbodiimide groups, such as described in German Pat. No. 1,092,007 and U.S. Pat. No. 3,152,162; polyisocyanates with isocyanurate groups, e.g., such as described in U.S. Pat. No. 3,001,973, German Pat. Nos. 1,022,789, 1,222,067 and 1,027,394, and German Offenlegungsschriften Nos. 1,929,034 and 2,004,048; the linear urea adducts of isophorone diisocyanate (IPDI) known under the trade names IPDI H3150 and IPDI H2921; isocyanurates of IPDI such as Isocyanurate T 1980; and the like. Polyisocyanates which contain from 2 to 4 NCO groups are particularly suitable in the practice of the inventions; polyisocyanates which contain 2 to 3 NCO groups, especially 2 NCO groups, are preferred.

The ratio of equivalents of NCO from the polyisocyanate reactant to equivalents of OH from the polyol reactant is within the range of from about 0.9 to about 1.1, desirably from about 0.95 to about 1.05, preferably about one. When a soft polyurethane elastomer is to be joined to the hard denture to form a unitary whole, the ratio of NCO equivalents to OH equivalents in the soft elastomer desirably is slightly greater than one, e.g., about 1.05, and the ratio of NCO equivalents to OH equivalents in the hard elastomer desirably is slightly less than one, e.g., about 0.95. This slight excess of NCO groups in the soft elastomer and slight excess of OH groups in the hard elastomer is sufficient to cause a chemical bonding between the optional soft elastomer formulation and the hard tooth-engaging portion of the denture. Upon curing, there is provided a denture in which the hard and soft portions are permanently bonded to each other. Alternately, the surface of the hard tooth-engaging portion can be coated with a primer formulation, e.g., prepared by mixing polyol and polyisocyanate, and thereafter applying the soft mouth-engaging elastomer formulation to the surface thus coated.

Illustrative of the various catalysts which can be employed include metallic catalysts and combinations thereof. Typical amine catalysts include tertiary amines, such as triethylamine, tributylamine, N-methylmorpholine, N-ethylmorpholine, N-cocomorpholine, N,N,N',N'-tetramethylethylenediamine, 1,4-diazabicyclo(2,2,2,)octane, N-methyl-N'-dimethylaminoethylpiperazine, N,N-dimethylbenzylamine, bis(N,N-diethylaminoethyl)adipate, N,N-diethylbenzylamine, pentamethyldiethylenetriamine, N,N-dimethylcyclohexylamine, N,N,N',N'-tetramethyl-1,3-butanediamine, N,N-dimethyl-beta-phenylethylamine, 1,2-dimethylimidazole and 2-methylimidazole. Other suitable catalysts are known Mannich bases of secondary amines, such as diemthylamine, and aldehydes, preferably formaldehyde, or ketones, such as acetone, methyl ethyl ketone, cyclohexanone, and phenols, such as phenol, nonylphenol and bisphenol.

The novel dentures contemplated herein including novel Denture B are hard, rigid products having a hardness value of not less than about Shore D60. Inasmuch as the maximum value on the Shore D scale is 100 (a hardness approaching steel), the maximum Shore D hardness will obviously be less than this maximum value. Hardness values of Shore D 90 and upwards to Shore D95, and moderately higher, are contemplated within the scope of the inventions. The optional soft elastomer is characterized by a lower hardness value, suitably not exceeding Shore A 65. A suitable minimum hardness for the soft elastomer is about Shore A 15.

Optionally, there can be added to the hard denture formulation as well as to the soft elastomer formulation customary additives such as fillers, pigments, soluble dyestuffs, flavoring substances, scents, and other ingredients known to the technician in this art.

The reaction between the polyol reactant(s) and the polyisocyanate reactant(s) can be suitably effected at temperatures well known in the art, e.g., from room temperature to about 90' C., using effective amounts of catalyst, and if desired, antioxidants, UV stabilizers, and other components well known to this art. It is highly desirable to degas and to dehydrate the reactants, and to conduct the curing step in a closed mold.

The novel dentures can be prepared via the one-shot process, or via the prepolymer route, desirably the quasi-prepolymer route In the event the reactants are not readily fluid or are of undesirable viscosity at the chosen reaction temperature thus making the one-shot process impractical, this disadvantage can be overcome by preparing hydroxyl-terminated prepolymers or isocyanato-terminated prepolymers (preferably the latter)

The following embodiments are illustrative. The ASTM methods for determining certain values and properties are set out hereinbelow:
Isocyanate analyses: ASTM D 1638
Polyol analyses: ASTM D 2849
Heat distortion: ASTM D 648
Shore D Hardness: ASTM D 2240
Tensile Strength: ASTM D 2707
Elongation: ASTM D 2707
Flexural Modulus: ASTM D 790
Izod Impact Resistance: ASTM D 256

EMBODIMENT I

A. Seventy (70) gms. of the 4:1 molar reaction product of epsilon-caprolactone and pentaerythitol (0.473 hydroxyl equivalent), thirty (30) gms. of 1,4-butanediol (0.667 hydroxyl equivalent), and 38 gms. (1.12 NCO equivalent) of the isophorone diisocyanate adduct H3150 (NCO equivalent weight 134), available from Veba-Chemie, A.G., Gelsenkirchen, West Germany, are mixed in the presence of 0.3 gm of cobalt acetylacetonate catalyst, degassed at 1-3 mm pressure, and poured into a denture mold cavity. The materials are heated at about 70° C. in an oven for 4 hours. Upon demolding, the resulting denture is hard and rigid at the demolding temperature.

Using the materials and conditions stated above, test specimens are prepared for the measurement of the heat distortion temperature according to ASTM D648, having dimensions of 5 inches in length, 0.5 inch in depth, and 0.5 inch width. One week after preparation, the heat distortion temperatures of the specimens are found to be 80°-82° C., when measured by the above-identified test method. The Shore D hardness, according to ASTM D2240, is about 85.

B. In another experiment, there are prepared a hard denture and test specimens as above except that 165 gm of ISONATE ® 143-L (1.15 NCO equivalent of a mixture of 4,4'-diphenylmethane diisocyanate and its carbodiimide, available under this trademark from the Upjohn Company) is utilized in lieu of the isophorone diisocyanate adduct. Upon determining the heat distortion temperature, it is found to be in excess of 90° C., and the Shore D hardness is found to be about 88-90.

C. In like manner as above, polyurethane products exhibiting similar high heat distortion temperature, and suitable for the manufacture of hard dentures, are prepared by utilizing in lieu of the above-mentioned temperatures, the following: isophorone diisocyanate; 4,4'-methylene bis(cyclohexyl)isocyanate; and the Isocyanurate Adduct IPDI-T 1980, available from Veba-Chemie A.G., Gelsenkirchen, West Germany.

D. A polyol mixture of fifty-eight (58) gms of the epsilon-caprolactone reaction product of 1,1,1-trimethylolpropane having a hydroxyl equivalent weight of about 180 (0.322 equivalent of hydroxyl polyol), and twenty-five (25) gms of 1,4-butanediol (0.556 equivalent) is prepared and degassed. Thereupon, 117 gms (0.873 equivalent) of the isophorone adduct H3105, described above, previously degassed, and 0.03 gm of dibutyltin dilaurate, are added to the polyol mixture and the ingredients are mixed thoroughly. A portion of this mixture is cast into a denture mold cavity, while another portion thereof is cast into a sample mold for the measurement of other physical characteristics, including Shore D hardness, tensile properties, flexural modulus, and impact resistance.

After two weeks at room temperature, there is obtained a product having the properties listed in Table 1 below:

TABLE 1

| Hardness, Shore D (ASTM D 2240): | 84-85 |
|---|---|
| Tensile strength, psi (ASTM 2707): | 11,000 |
| Elongation, %: | 14 |
| Flexural Modulus (ASTM D 790) | |
| psi at 25° C.: | 265,000 |
| psi at 50° C.: | 222,000 |
| psi at 75° C.: | 136,000 |
| psi at 100° C.: | 6,000 |
| Izod Impact (ASTM D 256) ft. lb/in. | |
| Unnotched: | 11.1 |
| Notched: | 2.0 |

The above results demonstrate the excellent mechanical properties and the good temperature stability of the hard denture materials which properties, for example, are readily retained in the presence of very hot tap water which may reach 60°-70° C. Moreover, cleansing operations of the denture using peroxide tablets under hot tap water, fails to attack the denture surface or to distort the denture.

EMBODIMENT II

A. A quasi-prepolymer is prepared by reacting 3690 gms of ISONATE 143-L and 651 gms of an adipic acid polyester trademarked RUCOFLEX ® 1037-420 (RUCO Division, Hooker Chemicals and Plastics Company, Hicksville, Long Island, N.Y.), having a hydroxyl equivalent weight of 133, at 40° C. for 30 minutes, while stirring the reactants. After this time period, the exothermic reaction subsides. The resulting quasi-prepolymer has an NCO equivalent weight of 160.

One hundred grams of the above-said quasi-prepolymer (0.625 equivalent) is degassed at 50° C. at about 1-3 mm Hg. A total of 83 grams (0.625 equivalent) of RUCOFLEX ® 1037-420 branched adipate polyester polyol containing 0.1 gm catalyst (T-9 stannous octoate, available from Metal & Thermit Corp., Rahway, N.J.), is likewise degassed at 50° C. and 1-3 mm Hg. After the quasi-prepolymer and polyol are cooled to room temperature, they are mixed thoroughly and quickly cast into a denture mold. The mold is heated to 50° C. and is maintained for a period of 30 minutes, whereupon the denture is demolded.

After one week, the denture is subjected to very hot tap water for 30 minutes. The tap water is measured to have a temperature of about 65° C. The denture does not deform under these conditions.

B. A blend of 80 grams of RUCOFLEX 1037-420 (0.60 equivalent) and 20 grams of 1,4-butanediol (0.444 equivalent) are mixed and degassed at room temperature. In a separate flask, 138 grams (1.04 equivalent) of the isophorone diisocyanate adduct H3150 (described in Embodiment I A), containing 0.1 gram of dibutyltin dilaurate is degassed at room temperature at 1-3 mm Hg.

The above degassed mixtures are blended thoroughly at room temperature and cast into a denture mold. The mold is heated at 75° C. for a period of 2 hours and demolded. After one week at room temperature, the resulting denture is exposed to hot tap water (65° C.) for 45 minutes. No distortion is observed.

EMBODIMENT III

A. Seventy-five (75) grams of an ethylene oxide adduct of sorbitol having an equivalent weight of about 75 (1.0 equivalent), and 0.2 gram of cobolt acetylacetonate are mixed and degassed at room temperature. Concurrently, one hundred forty four (144) grams (1.0 equivalent) of ISONATE ® 143-L are degassed. These degassed ingredients are mixed together thoroughly and one aliquot thereof is cast into a denture mold. The other aliquot is cast into a mold suitable for the preparation of heat distortion specimens. The cast mixtures are held in the molds at 50°-60° C. for 2 hours, whereupon they are demolded.

After twenty four (24) hours, the resulting hard denture is exposed to hot tap water (65° C.) for one hour. No distortion is observed. Measurement of the heat distortion property one week after preparation of the specimens confirms resistance against distortion at temperatures up to 85° C.

B. Seventy-five (75) grams of the above ethylene oxide adduct of sorbitol (1.0 equivalent), is mixed with 10 grams (0.323 equivalent) of ethylene glycol and 0.25 gram of nickel acetylacetonate, and the resulting mixture is degassed at room temperature. Concurrently, 175 grams (1.32 equivalent) of the isophorone polyurea adduct H3150, described previously, is also degassed at room temperature. The polyolcatalyst mixture and the isocyanate adduct is mixed thoroughly. A portion thereof is cast into a denture mold, while another portion is cast into a multi-cavity mold for the preparation of heat distortion specimens. The cast polyurea-urethanes are subjected to a mold temperature of 80°-90° C. for one hour and demolded.

One week thereafter, the hard denture prepared according to the foregoing procedure exhibits no distortion when immersed for one hour in water of 70° C. Measurement of the heat distortion reveals that the material does not soften until a temperature in excess of about 85°-87° C. is reached.

It is to be understood that the invention is not to be limited to the exact details of operation or structure shown and described as obvious modifications and equivalents will be apparent to one skilled in the art.

What is claimed is:

1. An artificial denture fabricated from a hard, rigid, substantially non-hydrophilic polyurethane elastomer having a heat distortion temperature of not less than about 65° C., said hard elastomer being the reaction product of a mixture consisting esentially of: (a) an organic polyisocyanate having at least two isocyanato groups and at least one cycloaliphatic or aromatic ring structure, at least one isocyanato group being directly bonded to the cycloaliphatic or aromatic structure or at least two isocyanato groups being bonded to separate divalent $C_1$-$C_4$-aliphatic hydrocarbon chains which in turn are bonded to the cycloaliphatic or aromatic structure; and (b) branched chain polyester polyols selected from the group of (i) esterification polyol products resulting from the rection of polycarboxylic acids and polyols wherein the ratio of hydroxyl groups to carboxyl groups exceeds one, and (ii) lactone polyols; (c) the hydroxyl equivalent weight of said polyester polyols being in the range of about 50 to 180; and (d) the ratio of isocyanato equivalents to hydroxyl equivalent being in the range of from about 0.9 to about 1.1.

2. The artificial denture of claim 1 wherein said polyurethane elastomer has a heat distortion temperature of at least about 70° C.

3. The artificial denture of claim 1 wherein said branched chain polyester polyol contains from 3 to 6 hydroxyl groups.

4. The artificial denture of claim 3 wherein said branched chain polyester polyol is a lactone polyol which is characterized by at least about 0.5 to about 1.2 oxyalkylenecarbonyl units per hydroxyl group, said oxyalkylenecarbonyl having the formula

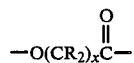

wherein each R individually is hydrogen or $C_1$-$C_4$-alkyl and wherein x is an integer of from 5 to 7.

5. The artificial denture of claim 4 wherein said lactone polyol has from about 0.5 to about 1.2 oxycaproyl units per hydroxyl group.

6. The artificial denture of claim 5 wherein said organic polyisocyanate is isophorone diisocyanate, 4,4'-dicyclohexylmethane diisocyanate, urea adducts of isophorone diisocyanate, 4,4'-diphenylmethane diisocyanate and its carbodiimide mixtures thereof.

* * * * *